H. PORTER.
Hoe.

No. 27,382.

Patented Mar. 6. 1860

Witnesses.
Wm Packard
Philo Packard

Inventor.
Huntington Porter

UNITED STATES PATENT OFFICE.

HUNTINGTON PORTER, OF CUMMINGTON, MASSACHUSETTS.

IMPROVEMENT IN HOES.

Specification forming part of Letters Patent No. 27,382, dated March 6, 1860.

*To all whom it may concern:*

Be it known that I, HUNTINGTON PORTER, of Cummington, in the county of Hampshire and State of Massachusetts, have invented a new and useful Farm-Hoe; and I do hereby declare that the following is a full, clear, and exact description thereof, reference being had to the accompanying drawings, forming a part of this specification, in which—

Figure 1:
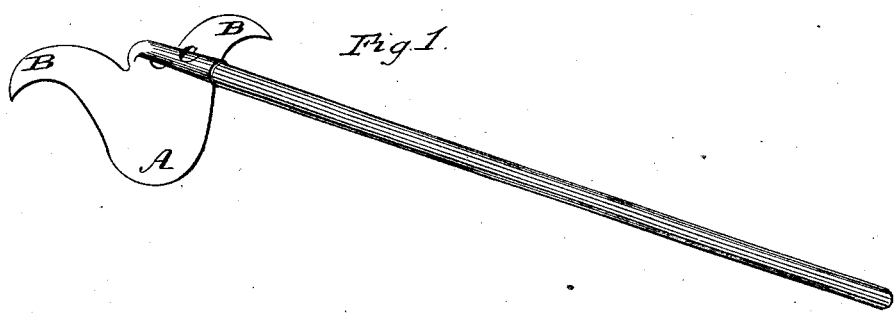
Figure 2:
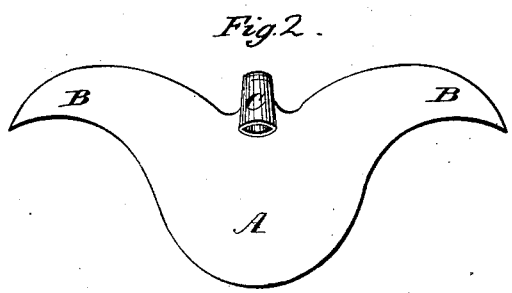

Figure 1 represents a perspective view of my hoe with a handle attached. Fig. 2 is a view showing the peculiar form of my hoe.

My improvement in the construction of hand-hoes I denominate the "Eagle Hoe" on account of its resemblance to the outline of that bird with its wings spread. This particular form of hoe has been found to possess peculiar advantages over the ordinary straight-edged or the triangular hoe or the thrust-hoe in weeding small plants and for scraping and loosening the earth about young plants more effectually where the crops are put in the ground in the broadcast or narrow-row system.

The form of my hoe will be readily understood by reference to the drawings, A being a curved portion, which is continued out by two wings, B B, which terminate in sharp points. The socket C, for attaching the hoe to the handle, is on top of the hoe and between the two wings B B.

This hoe is intended specially for thinning out such plants as stand in a very close state where the ordinary square hoe will not answer the purpose and cannot be worked among the plants without thinning them out too much and injuring their tender roots. Besides, the constant use of the square hoe with its straight edge becomes laborious and tiresome to the person using it.

The cutting-edge of my hoe, it will be seen, is made in such a manner that the hoe will penetrate the earth with a drawing stroke, while the portion A will penetrate the soil a sufficient distance to admit air and moisture and render the soil fine between the rows of plants, and the wings B B, which are not intended to penetrate the earth so far, will cut out the useless weeds with a considerable degree of exactness, and with a great deal less labor and time and in a more perfect and effectual manner than with the common hoe.

What I claim as my invention, and desire to secure by Letters Patent, is—

The arrangement of the peculiarly curved and pointed wings B, socket C, and round blade A, as and for the purposes herein shown and described.

HUNTINGTON PORTER.

Witnesses:
WM. PACKARD,
PHILO. PACKARD.